(12) United States Patent
Hart

(10) Patent No.: US 7,543,744 B2
(45) Date of Patent: Jun. 9, 2009

(54) COMBINED MULTI-SET INVENTORY AND EMPLOYEE TRACKING USING LOCATION BASED TRACKING DEVICE SYSTEM

(75) Inventor: Matt E. Hart, Lunenburg, MA (US)

(73) Assignee: Intuit Inc., Mountain View, CA (US)

( * ) Notice: Subject to any disclaimer, the term of this patent is extended or adjusted under 35 U.S.C. 154(b) by 492 days.

(21) Appl. No.: 11/066,744

(22) Filed: Feb. 24, 2005

(65) Prior Publication Data

US 2006/0186201 A1 Aug. 24, 2006

(51) Int. Cl.
*G06F 19/00* (2006.01)
(52) U.S. Cl. .............................. 235/385; 705/22; 705/28
(58) Field of Classification Search .................. 235/385; 705/22, 28
See application file for complete search history.

(56) References Cited

U.S. PATENT DOCUMENTS 6,121,926 A * 9/2000 Belcher et al. .............. 342/450

OTHER PUBLICATIONS

"White Paper: Beyond the Tag—Finding RFID Value in Manufacturing & Distribution Applications," Intermec Technologies Corporation, 2004, 7 pages.

* cited by examiner

*Primary Examiner*—Ahshik Kim
(74) *Attorney, Agent, or Firm*—Gunnison, McKay & Hodgson, L.L.P.; Philip J. McKay

(57) ABSTRACT

An assembly job tracking system includes tracking devices for employees and inventory sets required for the job. As the inventory moves from assembly location to assembly location, in one embodiment, wireless stations receive data identifying the tracking device and information related to the job. Various techniques for determining the location of the tracking devices include radio frequency signal source triangulation, assembly location specific RFID tags, local wireless stations located in the assembly location, and barcode scanning stations. A system controller and an associated data storage device control the tracking process and record data associated with the assembly job, equipment utilization, and employee efficiency. Based on location determination of the tracking devices, assembly job tracking records start and end times of multiple process steps. A system controller provides data that is analyzed to provide reports, including, invoice related reports, employee wages, and equipment usage and efficiency.

18 Claims, 8 Drawing Sheets

COMBINED MULTI-SET INVENTORY AND EMPLOYEE TRACKING USING LOCATION BASED TRACKING DEVICE SYSTEM

FIELD OF THE INVENTION

The present invention relates generally to assembly job tracking, and more particularly to systems and methods for the combined tracking of multi-set inventory and employees for job assembly processes.

BACKGROUND OF THE INVENTION

Conventional assembly job tracking systems rely on employee input. Employee input may include some level of automation, e.g., swiping a magnetic card, stamping time cards, or the like, but generally require some form of manual data entry into the tracking system. Some conventional tracking systems include one or more data entry stations. The data entry stations are typically located in central locations within assembly floors to facilitate the data entry task. Data entry for tracking purposes requires time that would better used to assemble or manufacture the final products, i.e., generating income. However, there is still some time wasted in the entry of tracking data. For example, even if the entry station is centrally located, entry of tracking data, e.g., job number and time between assembly process steps, requires employees to travel back and forth to the data entry station.

In addition, this time consuming data entry process is subject to errors in the tracking data collected. Since in most circumstances there is some amount of data that is manually entered by the employees, human error becomes a factor in the integrity of the data collected. In addition, the conventional tracking process relies heavily on worker discipline, e.g., requires the employee to remember to enter tracking data between jobs. The amount of data collected is generally very limited in an effort to expedite the process since the tracking data entry takes up valuable labor time that could more efficiently be used in the assembly process.

Due to the limited amount of tracking data collected, accurate account of the status of each job and the location of the job's inventory typically becomes a manual audit by actually walking the assembly area. Further, with the limited amount of tracking data it is difficult to detect assembly steps causing bottlenecks, what the most efficient use of the equipment is, or to accurately track worker efficiency, worked hours, and the like.

Accordingly, there is a need for an assembly job tracking system that automatically tracks simultaneously different pieces of inventory for a job, employee efficiency and working time, and actual locations of inventory "in progress" to efficiently track and report various parameters of job related assembly, including time, cost, status, and equipment and employee related efficiencies.

SUMMARY OF THE INVENTION

Automated tracking of sets of inventory components of an assembly job and the employees who work on their assembly is performed based on tracking devices associated with each set of inventory and with each employee. The tracking devices are used to determine the location of the inventory and employees within an assembly area. The determination of the location of each component/employee and timestamps associated with changes in location provides a basis for tracking the timing of the assembly process. The location and timing information is combined with other information to automate the generation of reports for the assembly process. For example, automated reports can be generated with information regarding job invoice based on time and materials used, order tracking within the assembly process, forecasts for job completion, machine utilization, employee efficiency, and the like.

In one embodiment, a computer-based method for tracking inventory and labor associated with an assembly job includes tracking the location of two or more inventory items associated with the assembly job. The method includes tracking the location of an employee with respect to the location of inventory items associated with the assembly job. Information relating to changes in location of inventory items and of employees, including the times at which the changes in location take place, is recorded. The recorded information is used to provide a report associated with the assembly job that includes information related to time required for completion steps of the assembly job.

In another embodiment, a computer-based method for tracking an assembly job with a plurality of inventory sets in a multi-step assembly process includes determining a first assembly location in which a first inventory set is located based on tracking data received from a first inventory tracking device in the first inventory set. The assembly location is associated with a step of the assembly process. The method also includes determining a second assembly location in which an employee is located. The location is determined based on tracking data received from an employee-tracking device of that employee. This assembly location could be the same location in which the first inventory set is located. The method also includes determining a change in assembly location of the first inventory set from the first location to another location associated with another step of the assembly process. The time for the first assembly step is recorded based on the assembly locations of the inventory set and the employee and based on the change in location of the inventory set.

According to another embodiment, a computer-based method for tracking an assembly job with a plurality of inventory sets in a multi-step assembly process by multiple employees includes receiving data from an inventory wireless tag of a first inventory set. The method also includes receiving data from an employee wireless tag of an employee. An assembly location where the inventory wireless tag and the employee wireless tag are is determined. Then job data for the assembly process step is recorded. The job data includes the data from the inventory wireless tag, the data from the employee wireless tag, and identifying information for that assembly location.

In addition, the method includes receiving data from another employee wireless tag of a second employee. A second assembly location is determined where the inventory wireless tag and the second employee wireless tag are based on the data received from the wireless tag of the second employee and a second reception of data from the inventory wireless tag. As before, job data for the second assembly process step that takes place in the second assembly location is recorded. The job data includes the data received in the second reception from the inventory wireless tag, the data from the second employee wireless tag, and identifying information for the second assembly location. The method includes analyzing the stored job data to provide a report of the assembly job. The report includes times, assembly locations of the inventory sets, and assembly locations of the employees throughout the multi-step assembly process.

In another embodiment, assembly locations are associated with wireless stations and to determining locations includes receiving data from the wireless station associated with the corresponding assembly location. Another embodiment includes triangulating the source of the wireless signals transmitted by the tracking devices to determine locations. In yet another embodiment, the assembly locations include a wireless tracking device that is used to determine the location.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE PREFERRED EMBODIMENTS

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Figure 1A:
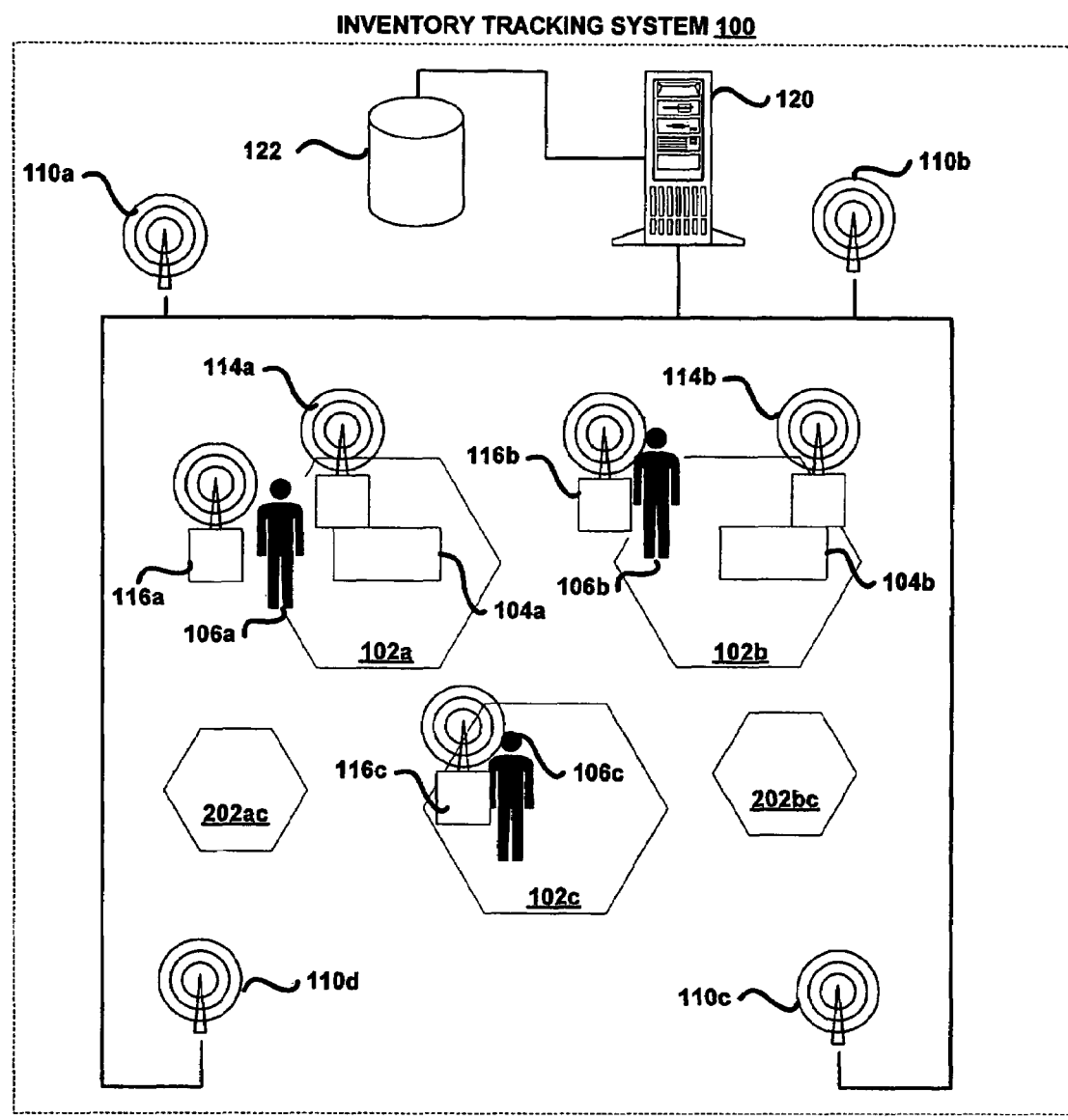
FIG. 1A shows one embodiment of a wireless-based assembly job tracking system.

FIG. 1 shows one embodiment of a wireless-based assembly job tracking system. The tracking system 100 includes several assembly locations 102. Generally, each assembly location 102 includes one or more pieces of equipment to perform one step of a multi-step assembly process for an assembly job. Although FIG. 1 shows three locations 102a, 102b, and 102c, any number of locations and related steps can be used with the tracking system 100 as detailed below.

Assembly jobs include multiple sets of inventory 104. By way of example, FIG. 1 shows two sets of inventory 104a and 104b. For example, an assembly job includes a first step at location 102a with inventory set 104a, a second step at location 102b with inventory set 104b, and a third step at location 102c in which inventory sets 104a, and 104b are combined into the final product.

For tracking purposes, each inventory set 104 is associated with an inventory wireless tracking device 114. In one embodiment, the inventory wireless tracking device 114 is a conventional radio frequency identification tag ("RFID tag"). In addition, employees 106 are also associated with wireless tracking devices 116, e.g., employee RFID tags. Wireless stations 110 include antennas that can communicate with the wireless tracking devices 114 and 116. The wireless stations 110 are connected to a system controller 120 to receive data from the wireless tracking devices 114 and 116.

In one embodiment, the system controller 120 is a hardware and software computer system. For example, in one embodiment, system controller 120 is a dedicated computer system operating with software programs for tracking assembly jobs. In another embodiment, system controller 120 is a general-purpose computer with specialized software programs for tracking assembly jobs. The system controller 120 is configured to receive tracking data from the wireless stations 110 and for processing the tracking data and other input information, such as time, radio frequency receive powers, and the like. In addition, the system controller 120 is configured to create and store assembly job tracking data for storage in a data storage unit 122. For this purpose, the system controller 120 is coupled to a data storage unit 122. In one embodiment, the data storage unit 122 is included within a computer system that implements the system controller 120 functions. In an alternative embodiment, the data storage unit 122 is part of a data storage system located apart from the system controller on a data network.

Figure 1B:
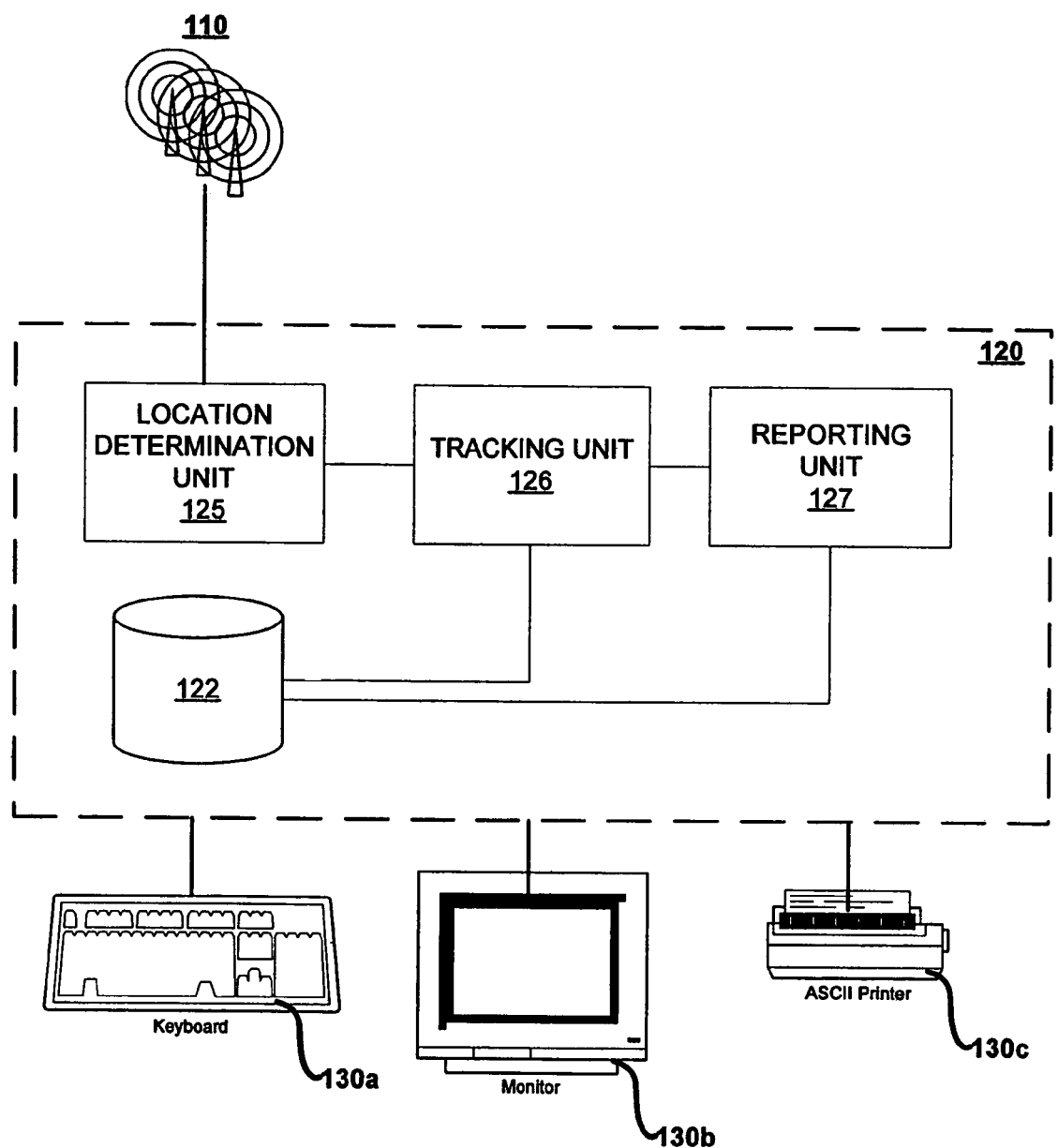
FIG. 1B shows a functional block diagram for one embodiment of a system controller.

Now referring to FIG. 1B, FIG. 1B shows a functional block diagram for one embodiment of a system controller. In one embodiment, the system controller 120 includes a location determination unit 125. The location determination unit is connected, wired or wirelessly, to base stations 110 to receive the tracking data from the tracking devices 114 and 116. For example, in one embodiment, tracking data from a tracking device includes position coordinates of the position where the tracking device is. The position coordinates can be x,y type coordinates that can be mapped to an electronic representation of the layout of the assembly area. In addition, the assembly locations within the assembly area are defined in terms of sets of those coordinates. For example, sets of contiguous or nearby coordinates that fall within a defined assembly location, e.g., 102a, are mapped to that assembly location to indicate that the tracking device, and the corresponding item or employee, sending those coordinates is located in that assembly location.

Moreover, in one embodiment, the system controller 120 includes a tracking unit 126 that is receives information from the location determination unit 125. In one embodiment, the tracking unit receives the assembly locations where the tracking devices are and timestamps with the current time changes in location. The tracking unit can also compare the relative locations of each of the tracking devices. For example, the tracking unit can determine when inventory 104a is in assembly location 102a at the same time as employee 106a. The tracking unit then accesses the data storage unit 122 to store data associate with the assembly location and times when inventory and employees move about the assembly area. For example, in one embodiment, upon determining that inventory 104a and employee 106a are in assembly location 102a, the tracking unit stores the start time for the assembly step associated with assembly location 102a.

In addition, in one embodiment, the system controller 120 includes a reporting unit 127. The reporting unit Other configurations of the system controller 120 and data storage unit 122 are possible.

Referring back to FIG. 1, one embodiment of an assembly job tracking system includes wireless stations 110 distributed in locations throughout an assembly area with respect to the assembly locations 102. In this embodiment, the wireless-stations 110 are configured to receive wireless transmissions (e.g., radio frequency ("RF"), infrared ("IR"), or the like) from wireless tracking devices 114 and 116 such that the location of any given wireless tracking device 114 or 116 can be determined. For example, the location of the wireless tracking devices 114 and 116 is determined by triangulation of the source of the RF radiation of a transmitter uniquely associated with a wireless tracking device.

Referring back to FIG. 1, one embodiment of an assembly job tracking system includes holding or staging locations 202. Staging locations 202 are located between assembly locations 102 for queuing inventory sets 104 before an assembly step or location 102 while the assembly location 102 is being used for another job. Staging locations 202 are not necessarily physically "between" any particular assembly locations 102. However, in the logical assembly process flow, the staging location or locations 202 are "between" assembly locations 102 to physically store or hold inventory sets 104 that need to be process in an assembly location 102 that is currently processing another job. Like with assembly locations 102, the system controller 120 can determine the location of any tracking device 114 or 116 to be within a staging location 202. When the system controller 120 determines that an inventory set 104 is in a staging location 202, the wait time at the staging location 202 is recorded and tracked for reporting purposes. For example, efficiency or utilization reports can be used to identify bottlenecks of the assembly process based on current data automatically without the need for an audit or inventory by reporting average wait times for each assembly location 102. Similarly, based on the staging location 202 and finished process steps, inventory for unfinished assembly jobs that are "in process," i.e., have added value beyond the raw materials, can be audited for their added value in real time, e.g., for tax reporting purposes, valuation purposes, or the like. This, "in process" tracking information is also valuable for automating forecasts and estimated assembly completion times that can be used for reporting to customers.

Figure 2:
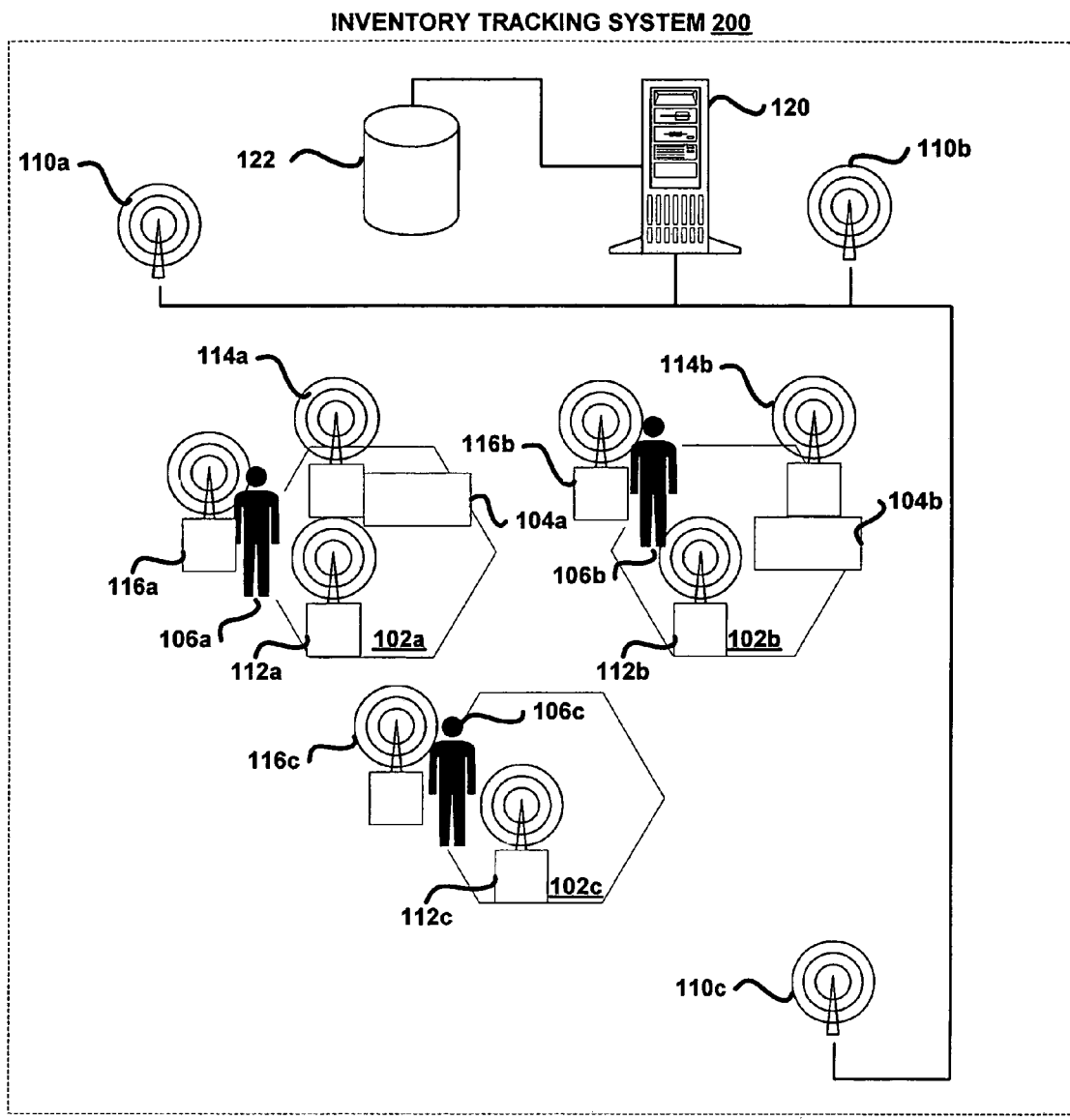
FIG. 2 shows an alternative embodiment of a wireless-based assembly job tracking system.

Now referring to FIG. 2, an alternative embodiment of a wireless-based assembly job tracking system is shown. In this embodiment, assembly locations 102 are also associated with a wireless tracking device 112, e.g., location RFID tag. According to this embodiment, wireless stations 110 are configured to receive wireless transmission from the assembly location 102 that is closest to the wireless station 110. For example, referring back to FIG. 2, wireless station 110a is configured to receive wireless signals originated in assembly location 102a. Thus, wireless station 110a would be capable of receiving wireless signals from wireless tracking devices 112a, 114a, and 116a. Once the assembly step at assembly location 102a is completed and the inventory set 104a moves to assembly location 102c, wireless station 110c receives inventory wireless tracking device 114a in addition to location wireless tracking device 112c and employee wireless tracking device 116c.

Figure 3:
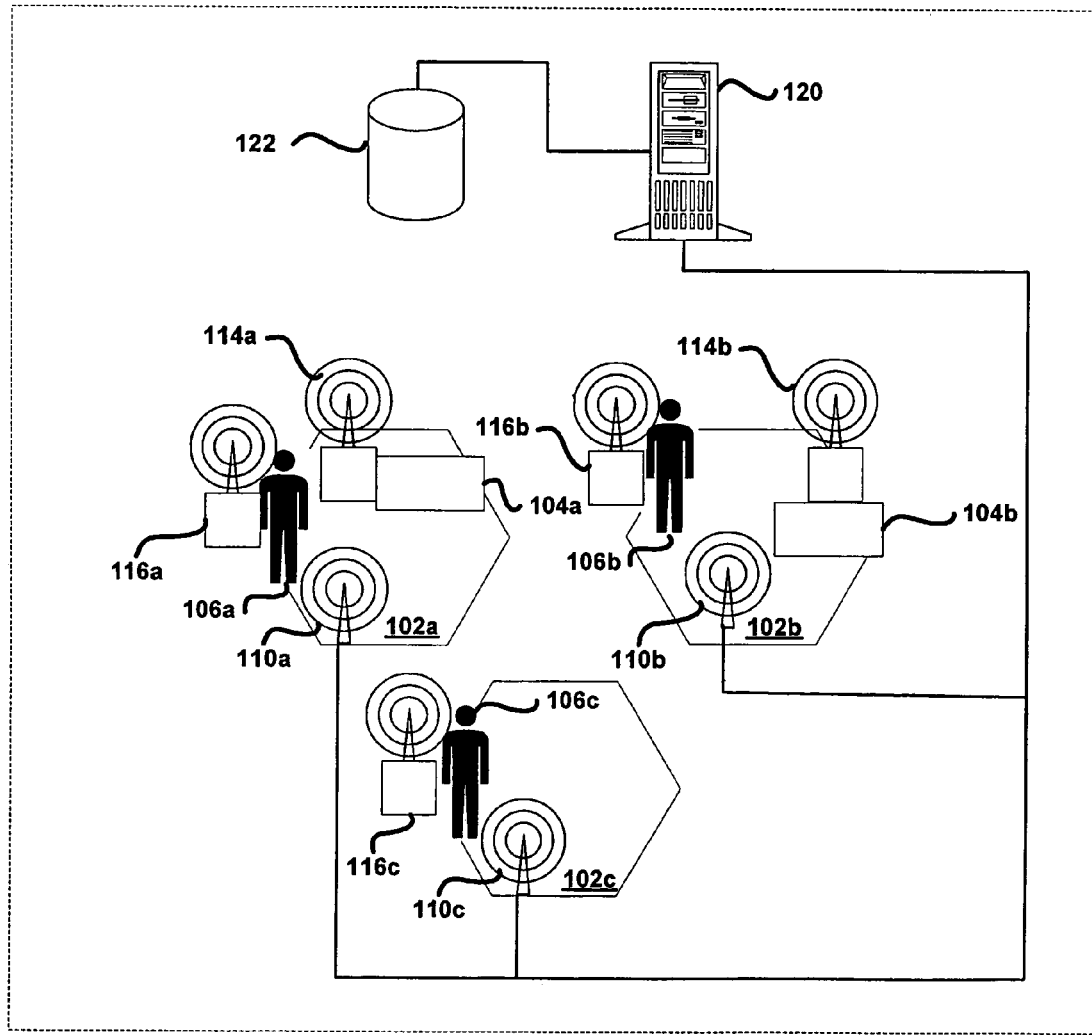
FIG. 3 shows another embodiment of a wireless-based assembly job tracking system.

Yet another embodiment of a wireless-based assembly job tracking system is shown in FIG. 3. According to this embodiment, each assembly location 102 includes an associated local wireless station 110. The local wireless station 110 provides a unique identifier with its data communications with system controller 120 that identifies the associated assembly location 102. In addition, each local wireless station 110 is configured to receive short-range wireless communications from wireless tracking devices 114 and 116 within the assembly location 102 associated with the wireless station 110.

Figure 4:
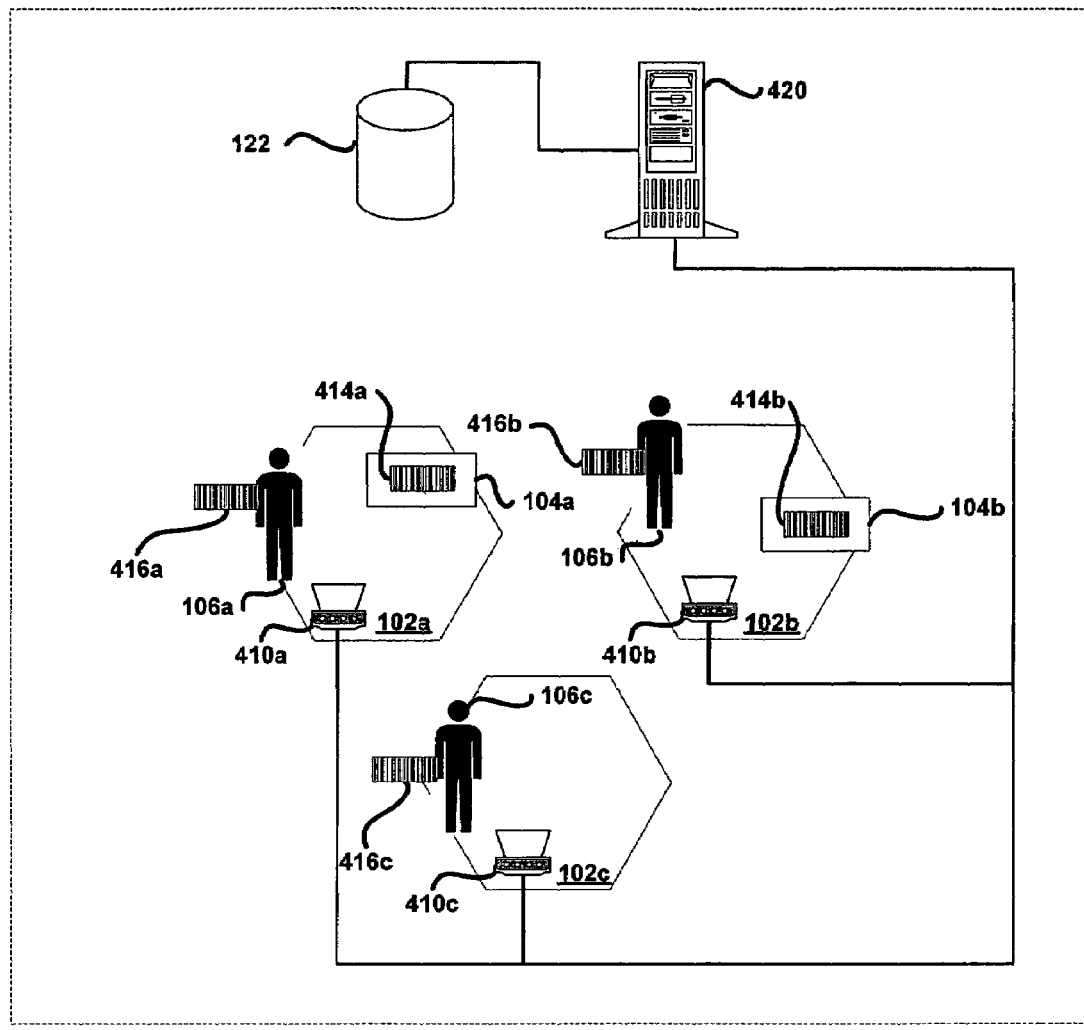
FIG. 4 shows an alternative embodiment of an assembly job tracking system.

Now referring to FIG. 4, an alternative embodiment of an assembly job tracking system is shown. In this embodiment, inventory barcode tracking devices 414 are associated with the inventory sets 104 and employee barcode tracking devices 416 are associated with the employees 106. At each assembly location 102 a barcode reading station 410 is located and configured to read or scan barcode tracking devices 414 and 416 that enter the assembly location 102. The barcode reading stations 410 are connected, either by wire or wirelessly, to a system controller 420 that receives barcode tracking data from all the barcode tracking devices 414 and 416 in the assembly locations 102. In one embodiment, the system controller 420 is a general-purpose computer that executes barcode-based job tracking software for tracking assembly jobs. In one embodiment, the barcode tracking devices 414 are barcode tags with uniquely identifying barcodes for inventory sets 104. Similarly, barcode tracking devices 416 are barcode tags with uniquely identifying barcodes for employees 106. The barcode tracking data is stored in the data storage unit 122 coupled to the system controller 420. In addition, each barcode reading station 410 is uniquely associated with the assembly location 102 in which it is located. For example, in one embodiment barcode tracking data communicated from a barcode scanner 410a to the system controller 420 includes a unique identification string or number that identifies the assembly location 102a in which the barcode scanner 410a is located.

Figure 5:
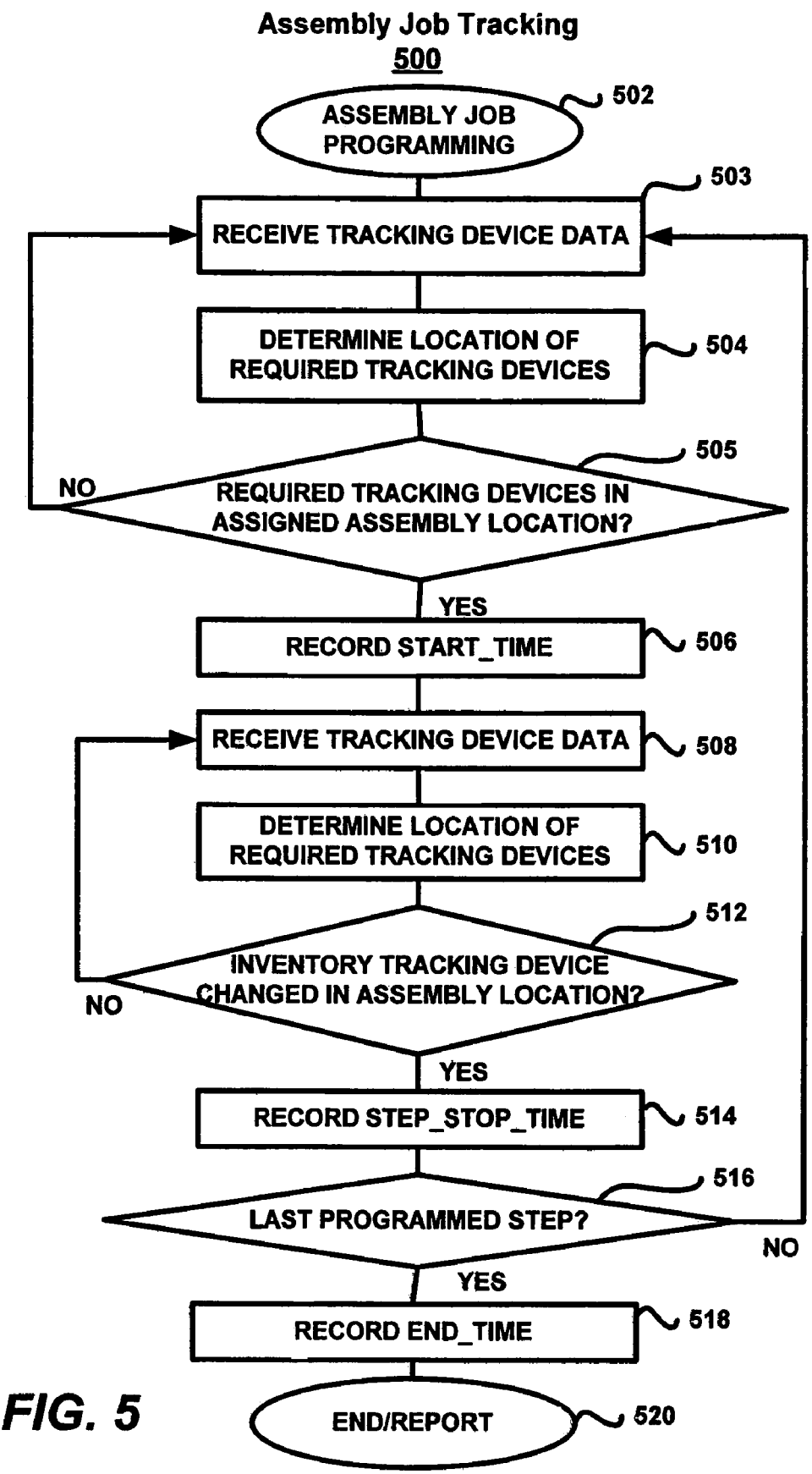
FIG. 5 shows a flow chart of one embodiment of an assembly job tracking method.

Now referring to FIG. 5, a flow chart of one embodiment of an assembly job tracking method is shown. According to this embodiment, an assembly job tracking method 500 includes programming 502 the assembly job requirements. Once the job is programmed 502, the assembly begins 505 when data from the first inventory set tracking device 114a and data from the employee tracking device 116a assigned to the first assembly location 102a for the assembly job are received 503 and determined 504 to be in the first assembly location 102a as specified in the job program. The START_TIME and other tracking data for the job is recorded 506 at this point. While the assembly step proceeds at this assembly location 102a, the status of the tracking devices 114a and 116a is periodically checked 512 by determining 510 if there is a change in assembly location 102 of the tracking devices 114a and 116a. Tracking data from tracking devices 114 and 116 is periodically received 508. From the received tracking data, the location 102 (or 202) of the tracking devices 114/116 is determined 510. If it is determined 512 that the first inventory set tracking device 114a is no longer at the first assembly location 102a, a first STEP_STOP_TIME and other tracking data for the job is recorded 514. The system then loops back 516 to the next assembly step programmed in the job employee tracking device 116 of the programming step 502 and waits until the required inventory tracking devices 114 and the assigned employee 106 are received 503 and determined 505 to be co-located in the programmed next assembly location 102b. After every assembly step is completed, the system checks 516 to determine if the completed step is the last assembly step programmed in for the job. Once the last step is completed, the END_TIME and other tracking data for the job is recorded 518 and the assembly job is terminated 520.

Figure 6:
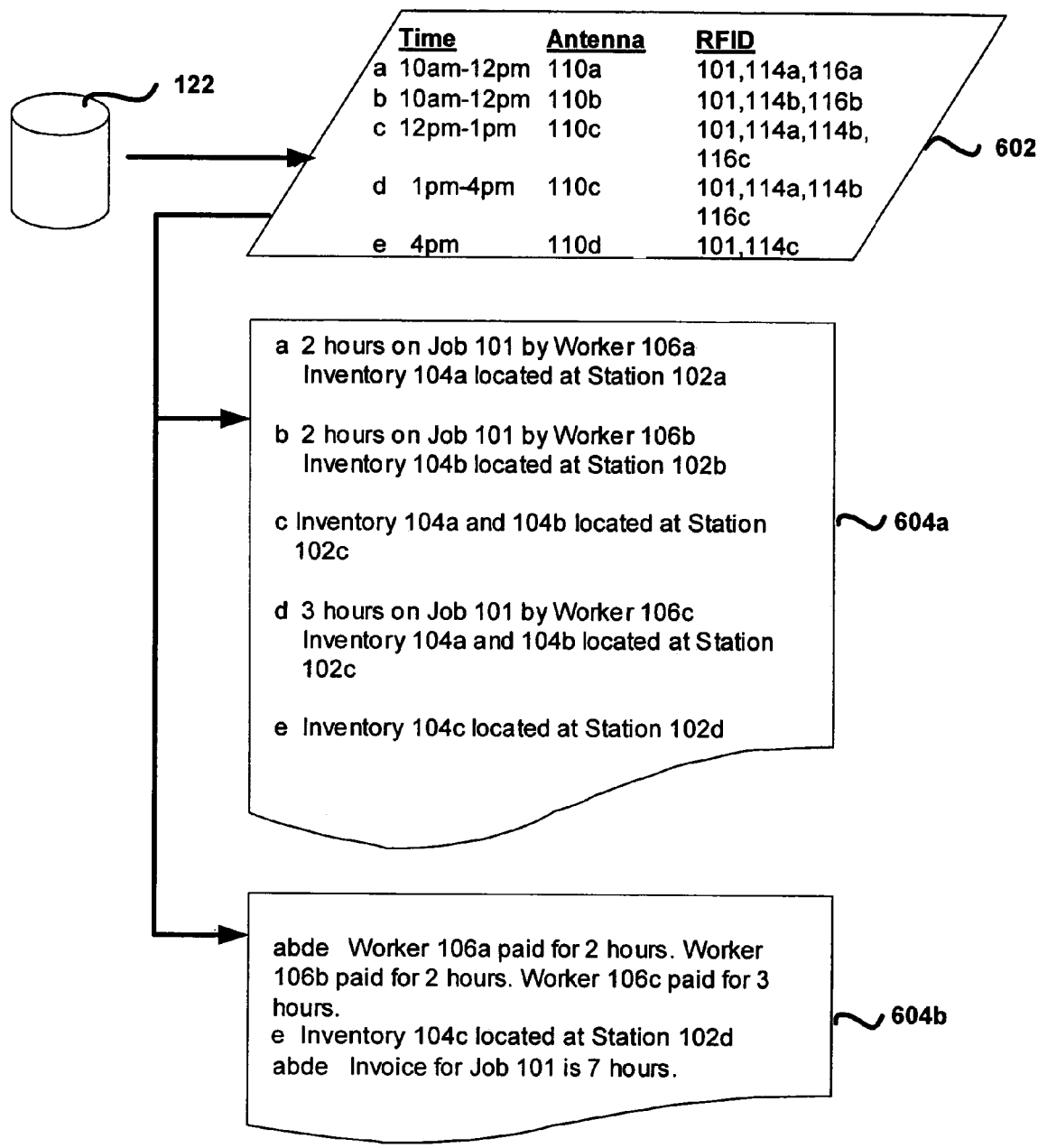
FIG. 6 shows a sample data analysis report output based on job tracking data according to one embodiment of the present invention.

In one embodiment, the data logs of recorded tracking data are analyzed 520 and reports for the assembly job are produced, e.g., client invoice, employee time sheets/wages, equipment utilization, and the like. FIG. 6 shows one sample data analysis report output based on job tracking data according to one embodiment of the present invention. In this embodiment, tracking data 602 recorded in data storage unit 122 includes times, antenna ids, and RFID tag ids. Based on the tracking data 602 interim step time, employee, and location reports 604a are generated. Similarly, after the completion of a job, a report 604b is generated with job completion information, e.g., final inventory location, labor time, invoice time, and the like.

Figure 7:
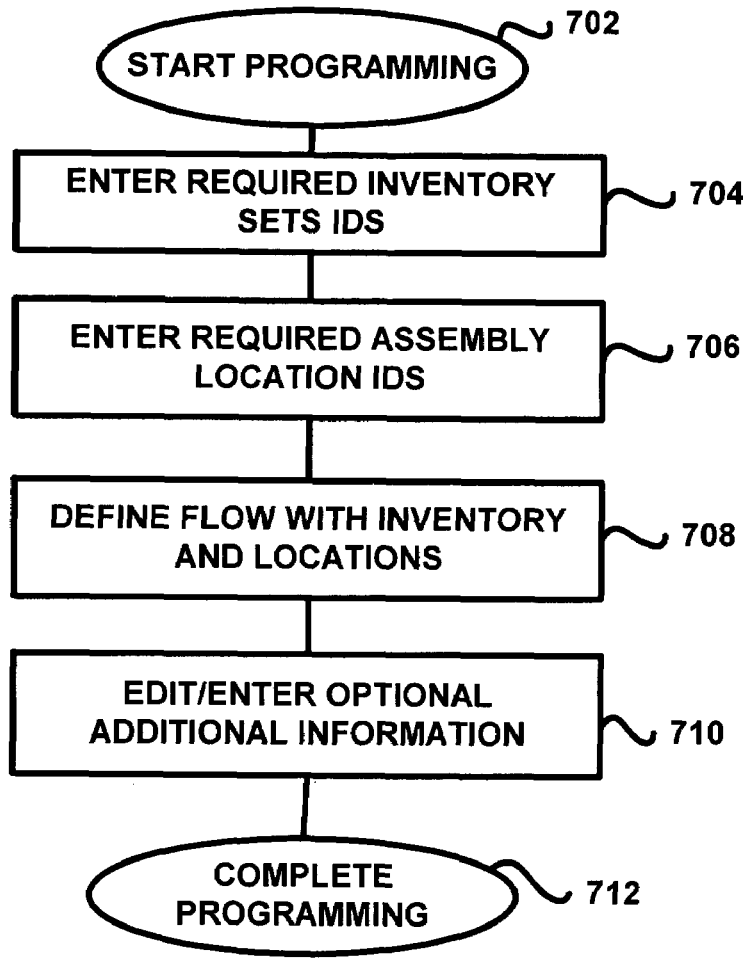
FIG. 7 shows a flow chart of one embodiment of a job programming process.

Now referring to FIG. 7, a flow chart of one embodiment of a job programming process is shown. The job programming 502 process entails providing information about the requirements for the assembly job, including, for example, identifiers for the associated assembly tracking devices 114 for the various inventory sets, assembly locations, employees, and the like. In one embodiment, the programming is started 702, for example, upon receipt of an order, by opening a new record associated with the assembly job. The identifiers for assembly tracking devices 114 for the inventory sets associate with the job are entered 702. The job program also includes entering or designating 706 the assembly locations 102 required to process the assembly job. The job programming also includes defining 708 the assembly process flow in terms of assembly locations 102 and the order in which the inventory sets 104 should be processed at each location 102. For example, one job programming includes one set of inventory 104a with an inventory identification number. The assembly process requires two steps, one at location 102a and one at 102b for completion. The process flow requires first processing inventory 104a at assembly location 102b and then processing at assembly location 102a. In one embodiment, this programmed information is sufficient for tracking the assembly job. Additional information, such as employee assignments, scheduled breaks, and the like, can be optionally supplied or edited 710 when programming the job or otherwise be part of the tracking program, e.g., provided 710 upon configuration, installation, upgrade, or the like. Once all required and optional assembly job information is entered, the job programming is completed 712.

The operation of the assembly job tracking method and system includes determining 504 and 510 the assembly location 102 in which the tracking devices 112, 114, 116, and the like, associated with the various inventory set 104, employees 106, and locations 102/202 or stations are. This determination is performed differently depending on the embodiment of the system for tracking assembly jobs.

In one embodiment, conventional radio frequency signal source triangulation, i.e., triangulation of transmitters of wireless signals, is used. Tracking device signals are received at multiple wireless stations 110 equipped with receiving antennas and radio receivers. The received power in the signal from the transmitter in the wireless tracking device (e.g., 114) is different at each of the multiple wireless stations 110. The receive power levels in combination with the known location of the receiving antennas is used to determine the position of the transmitter of the wireless tracking device and allowing the determination of the location, within the assembly area, of the inventory, employee, assembly location, or the like. For example, in one embodiment, a mapping of groups or sets of position coordinates within an assembly area to defined assembly locations within the assembly area is used to determine whether a piece of inventory or an employee is within the defined assembly area. The wireless tracking device provides position coordinates to a computer system that maps those coordinates to a floor plan of the assembly area defining the assembly locations. If the position coordinates fall within a set of coordinates assigned to an assembly location, the employee or inventory is determined to be in that assembly location.

In another embodiment, a wireless tracking device 112, e.g., an RIFD tag, is associated with the assembly location 102. In this embodiment, the receiver antennas of the wireless stations 110 are configured to receive wireless signals from an associated assembly location 102. Accordingly, a wireless station 110a receives tracking data for the associated assembly location 102a, and for employees 106, and inventory sets 104 within that assembly location 102a. Optionally, in another embodiment the system controller 120 uses receive power and location information from the wireless stations to triangulate the location of the source of wireless signals of the tracking devices 112, 114, and 116. Based on this information, the controller does not need to know the physical layout of the assembly floor and simply determines that employees 106 and inventory sets 104 are in an assembly location 102 based on the proximity of employee and assembly tracking devices 116 and 114 to the location of the location wireless tracking device 112. In this embodiment, assembly locations 102 can move around without affecting the tracking system.

In yet another embodiment, a local wireless station 110 is associated with each assembly location 102. In this embodiment, the local wireless station 110 is configured to receive tracking device data for tracking devices 114 or 116 that enter or are located in the associated assembly location 102. The local wireless station 110 provides a unique identifier in its communications with the system controller 120 or the system controller 120 is otherwise able to determine the source of tracking data communications, e.g., based on connection port number or the like. For example, a set of short-range radio transmitters are used as tracking devices 114/116 and the receive sensitivity of the receiver in the wireless station 110 is tuned to receive signals within the physical space determined to be the assembly location 102. The local wireless station 110 sends the data it receives from tracking devices 114/116 in the assembly location 102 to the system. controller 120 via a hardwire connection to a numbered input port. Based on the input port number, the controller 120 determines which local wireless station 110 sends the tracking data thereby determining the assembly location 102 in which the tracking devices 114/116 are located. In an alternative embodiment, each data transmission from local wireless stations 110 to the system controller 120 is uniquely identified by a string or number, e.g., an identifier field in a data packet header according to a transmission protocol. Thus, the system controller 120 can determine, based on the unique id with the received tracking data, the local wireless station 110 and associated assembly location 102 from which the tracking data is received, i.e., the assembly location 102 in which the tracking devices 114/116 are.

In an alternative embodiment, barcode reading stations 410 are associated with assembly locations 102. In one embodiment, each barcode reading station 410 is connected to a numbered port in the system controller 420 that uniquely identifies the assembly location 102 with which the barcode reading station 410 is associated. In an alternative embodiment, each data transmission from the barcode reading station 410 is uniquely identified with a string or number that corresponds to the barcode reading station 410, e.g., an identifier field in a data packet header according to a transmission protocol. Accordingly, the system controller 420 is able to identify the assembly location 102 from where the barcode tracking data (corresponding to inventory sets 104 and employees 106) was sent.

One feature of an assembly job tracking system and/or method includes the merging or combining of different pieces of inventory 104 into sub-assembled inventory components. For example, a first piece of inventory 104a can be processed in one step 102a and a second piece of inventory 104b is processed at another step 102b. Subsequently, both of these pieces of inventory 104a and 104b are combined into a single component 104c at a third step 102c. The newly formed piece inventory 104c is further processed at a fourth or more steps. To handle the combination of different pieces of inventory, a tracking device merging procedure is used.

In one embodiment, the job programming 502 defines the merging assembly locations 102. In this embodiment, once the previous steps of the assembly process are completed, the system determines the presence of the required inventory sets 104 to be combined at the pre-designated combining step or location 102 and from that step on simply ignores all the inventory tracking devices 114 but one. In an alternative embodiment, an employee 106 at a merging step 102 manually removes unused tracking devices 114 and leaves, adds, or reprograms an inventory tracking device 114 to be used with the combined inventory 104 from that assembly step on, until another combination/merge or until finishing the assembly job if no further combinations of inventory 104 are required. In this embodiment, the job programming expects the elimination of the unused tracking devices 114 and the receipt of tracking data from the new/reprogrammed tracking device 114 at the merging steps or locations 102.

It should be noted that in one embodiment, while at the various assembly locations 102, the employees 106 are able to reprogram inventory tracking devices 114 to add job or inventory-related data to the inventory tracking devices 114 for reporting to system controller 120. For instance, inventory set 104 for an assembly job could initially consist of 100 pieces. Some inventory is wasted or ruined during the manufacturing process. After an assembly step in which pieces are ruined, the assigned employee 106 updates the associated inventory tracking device 114 to indicate the number of remaining pieces, or, vice versa, the number of pieces wasted during the assembly process. Thus, tracking data received from tracking device 114 by controller 120 indicates the updated expected final count for the job. Similarly, inventory tracking devices 114 can also be programmed with assembly instructions for the next assembly step or location 102.

Another aspect of the assembly job tracking system and method includes employee 106 tracking. Based on the employee tracking devices 116, employees 106 are tracked as part of the job tracking process. Tracking employees 106 provides valuable data for job costing, wage calculation, equipment usability metrics, employee efficiency, and the like. For example, employee tracking in combination with inventory tracking and location determination uniquely provides the ability to determine the optimal performance of each employee with respect to the various duties assigned in a job assembly process. Accordingly, an assembly process can be optimally staffed by assigning employees 106 to the assembly location 102 that they are most efficient at with respect to a particular job requiring a particular inventory 104. For example, the system can provide employee efficiency reports that identifies employee 106a as being the most efficient with cutting station 102a when cutting material 104a while being most efficient at sewing station 102b when sewing material 104b. Thus, for a job that requires cutting and sewing material 104a, employee 106a would be assigned to assembly location 102a but for jobs requiring cutting and sewing material 104b, employee 106a is assigned to assembly area 102b.

One sample application of one embodiment of a job tracking system according to the present invention is a textile/garment assembly or manufacturing process. In this embodiment, a garment assembly job includes the cutting of two pieces of fabric 104a and 104b in cutting stations 102a and 102b and the assembly of the two pieces 104a and 104b into the final garment product 104c in sewing station 102c. The total number of units of final garment product 104c is then to be sent to shipping area. These job requirements and flow information is programmed 502 into the system controller 120. Assembly location 102a is a fabric cutting station for cutting pieces of fabric 104a. In this assembly location 102a, a fabric-cutting machine is operated by a first operator 106a, who is wearing an employee RFID tag 116a. The first fabric inventory set 104a has an associated inventory RFID tag 114a. For example, a basket or other container with the fabric includes an RFID wireless transmitter 114a, or the transmitter 114a is otherwise associated with the inventory set, e.g., in a lot traveler, a clipboard, or the like. In parallel, the other fabric material inventory set 104b is associated with a second inventory RFID tag 114b. The second fabric inventory set 104b is cut at assembly location 102b by operator 106b with a similar fabric-cutting machine.

Wireless receivers 110a through 110d are located throughout the assembly floor. The receivers receive the wireless signals from the RFID tags 114 and 116 that provide digitally encoded information, including an identification number that is associated with each inventory set 104 and with each employee 106, all of which had been entered into the system controller 120 before or during the job programming 502. The system controller 120 is connected to the wireless stations 110 to receive 503 wireless signal reception information and the digitally encoded data from the RFID tags 114/116. The system controller 120 determines 504 the location of the RFID tags 114/116 using a triangulation technique based on the wireless signal reception information. When the controller 120 determines 505 that the first fabric inventory 104a and employee 106a are located at assembly location 102a, it records 506 a start time for assembly location 102a. Similarly, when the system controller 120 determines 505 that the second fabric inventory 104b and employee 104b are at assembly location 102b, it records 506 a start time for assembly location 102b.

The system checks 512 periodically the reception 508 of digitally encoded tag information and wireless signal reception information to determine 510 if there is a change of location for the inventory 104a or 104b. After some time, inventory 104b is determined 512 to be at assembly location 102c. The system controller 120 records 514 a stop time for assembly location 102b. Subsequently, the controller determines 512 that inventory 104a is at assembly location 102c. The controller 120 records 514 an end time for assembly location 102a. In addition, some time later, the system controller 120 determines 505 that employee 106a, who is also assigned to operate sewing equipment at assembly location 102c is now also at location 102c. The controller records 506 a start time for assembly location 102c. As part of the assembly process at assembly location 102c, employee 106a deactivates RFID tag 114a and reprograms RFID tag 114b to a new code corresponding to the sewn fabrics that are now garments 104c. The controller 120 determines 512 that final garment inventory 104c is at shipping station 102d and records 514 the stop time for assembly location 102c. The system controller 120 determines 516 that assembly location 102d is the last programmed step and, records 518 the job end time.

The controller 120 automatically analyzes the recorded tracking data and reports 520 to the billing department at total job time for invoicing the client. The controller 120 also reports 520 to the labor tracking system the time worked by employees 106a and 106b. Further, the controller 120 updates various usage parameters in a monthly report database with the usage information for machines in assembly areas 102a, 102b, and 102c corresponding to their usage for the assembly of the finished job.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer-based method for tracking inventory and labor associated with an assembly job, the method comprising:
   tracking locations of two or more inventory items associated with the assembly job; tracking a location of an employee with respect to the location of at least one of the two or more inventory items associated with the assembly job;
   recording information relating to changes in the location of the two or more inventory items and of the location of the employee, the information including time at which the changes in location take place;
   providing a report associated with the assembly job, the report including information derived from the recorded information relating to changes in the locations of the two or more inventory items and of the employee; and,
   wherein the derived employee information includes one or more of employee work time and time-based employee salary calculations.

2. The method of claim 1, wherein tracking locations includes receiving wireless signals associated with a plurality of tracking devices, wherein each tracking device is associated with one of the two or more inventory items or the employee.

3. The method of claim 2, wherein receiving wireless signals includes receiving at an antenna from a plurality of antennas, where in each antenna is associated with an assembly location, and further wherein each assembly location is associated with a step of the assembly job.

4. The method of claim 2, wherein receiving wireless signals includes receiving at a plurality of antennas, the antennas physically distributed for triangulating the location of the plurality of tracking devices based on their associated wireless signals.

5. The method of claim 1, wherein the report includes an invoice for the assembly job based on the information derived from the recorded information.

6. A computer based method for tracking an assembly job with a plurality of inventory sets in a multi-step assembly process within an assembly area having a plurality of assembly locations, the method comprising:
   determining a first position within the assembly area based on tracking data received from a first inventory tracking device, the first position associated with a first inventory set;
   determining a second position within the assembly area based on tracking data received from a first employee tracking device, the second position associated with a first employee;
   recording starting information indicative of a job start time in response to determining that the first position and the second position correspond to a first assembly location within the assembly area associated with a first assembly step;
   determining a third position indicative of a change in assembly location of the first inventory set from the first assembly location to a second assembly location based on tracking data received from the first inventory tracking device, wherein the second assembly location is associated with a second assembly process step;
   recording a first assembly step time based on the starting information and in response to the change in assembly location of the first inventory set; and
   analyzing the recorded information to generate an assembly job report including time-based employee salary calculations for at least the first employee throughout the multi-step assembly process.

7. The method of claim 6, wherein the assembly job report includes at least times, assembly locations of the inventory sets, and assembly locations of the employee throughout the multi-step assembly process.

8. The method of claim 7, wherein the assembly job report includes time based pricing for the assembly job for preparation of a customer invoice associated with the assembly job.

9. The method of claim 7, wherein the assembly job report includes information about utilization of equipment at the assembly locations based on the recorded time information.

10. The method of claim 7, wherein the assembly job report includes in progress information of the assembly job.

11. The method of claim 10, wherein the in progress information includes expected completion time for the assembly job.

12. The method of claim 6, wherein the first assembly location and the second assembly location are each associated with a wireless station and further wherein determining a position includes receiving data from the wireless station associated with one of the first assembly location or the second assembly location.

13. The method of claim 6, wherein determining a position includes triangulating a source of wireless signals transmitted by the tracking devices.

14. The method of claim 6, wherein the first and second assembly locations each include one wireless tracking device.

15. The method of claim 14, wherein determining position includes receiving data from the wireless tracking device included in one of the first assembly location and the second assembly location.

16. The method of claim 6, further comprising:
   determining a fourth position within the assembly area based on tracking data received from a second employee tracking device, the fourth position associated with a second employee, wherein the fourth position corresponds to the second assembly location within the assembly area.

17. A computer system for tracking an assembly job with a plurality of inventory sets in a multi-step assembly process within an assembly area having a plurality of assembly locations, the system comprising:
   means for determining a first position within the assembly area based on tracking data received from a first inventory tracking device, the first position associated with a first inventory set;
   means for determining a second position within the assembly area based on tracking data received from a first employee tracking device, the second position associated with a first employee;
   means for recording starting information indicative of a job start time in response to determining that the first position and the second position correspond to a first assembly location within the assembly area associated with a first assembly step;
   means for determining a third position indicative of a change in assembly location of the first inventory set from the first assembly location to a second assembly location based on tracking data received from the first inventory tracking device, wherein the second assembly location is associated with a second assembly process step;

means for recording a first assembly step time based on the starting information and in response to the change in assembly location of the first inventory set; and, means for generating an assembly job report including time-based employee salary calculations for at least the first employee throughout the multi-step assembly process.

18. A computer system for tracking an assembly job with a plurality of inventory sets in a multi-step assembly process within an assembly area having a plurality of assembly locations, the system comprising:

a location determination unit for receiving position coordinates from a plurality of tracking devices associated with inventory sets and employees and for determining, for each tracking device, an assembly location in the assembly area where the tracking device is located;

a tracking unit communicatively coupled with the location determination unit for receiving the assembly locations of the tracking devices, the tracking unit for comparing assembly locations and storing data associated with the assembly locations and times associated with location changes of the inventory sets and the employees;

a reporting unit communicatively coupled to the tracking unit for analyzing the data and determining information for generating assembly job reports based on the data; and, wherein the generated assembly job reports include time-based employee salary calculations for the employees throughout the multi-step assembly process.

* * * * *